No. 659,518. Patented Oct. 9, 1900.
T. ESTLACK.
PLANT CUTTER AND LIFTER.
(Application filed May 23, 1900.)
(No Model.)
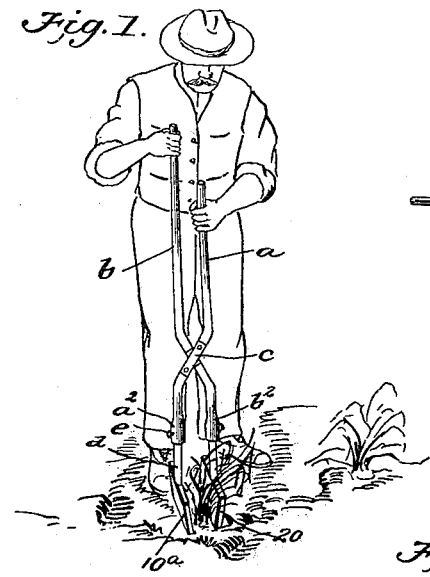
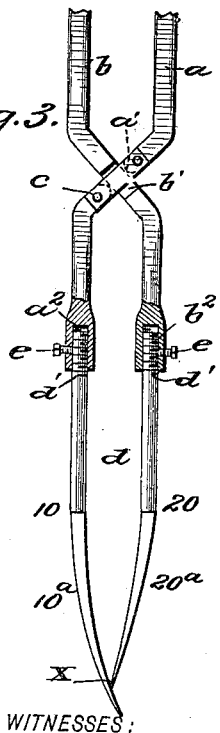
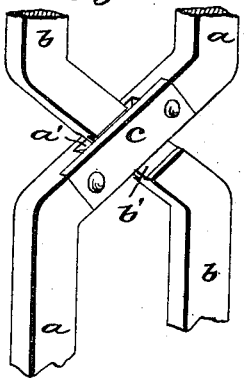
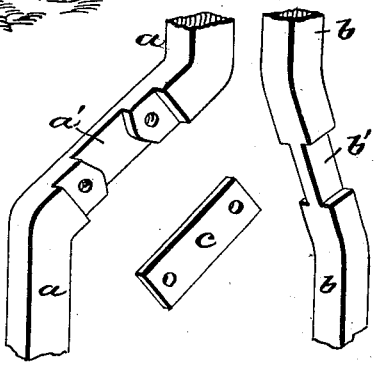
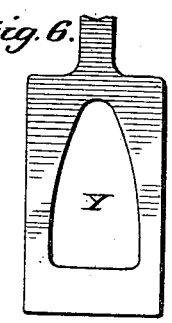
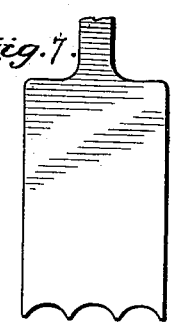
WITNESSES:
Louis Dieterich
Geo. M. Copenhaver
INVENTOR
Thomas Estlack.
BY
Fred G. Dieterich
ATTORNEYS
THE NORRIS PETERS CO., PHOTO-LITHO., WASHINGTON, D. C.

UNITED STATES PATENT OFFICE.

THOMAS ESTLACK, OF THOROFARE, NEW JERSEY.

PLANT CUTTER AND LIFTER.

SPECIFICATION forming part of Letters Patent No. 659,518, dated October 9, 1900.

Application filed May 23, 1900. Serial No. 17,664. (No model.)

*To all whom it may concern:*

Be it known that I, THOMAS ESTLACK, residing at Thorofare, in the county of Gloucester and State of New Jersey, have invented a new and Improved Plant Cutter and Lifter, of which the following is a specification.

This invention relates to an improvement in that class of hand implements used for pulling out plants and which embodies in its general make-up a pair of pivoted tongs, each having a handle portion at one end and a claw or clamping-jaw at the other end and which are capable of being so manipulated that the jaws may be readily closed upon the plant to pull it up.

My invention comprehends in its entirety a pair of pivoted tongs having the handle portions and the claws so arranged relatively to admit of the implement being used by the operator without requiring the said operator to assume a stooping position, the said implement being more especially provided for use in asparagus fields to cut off the plant and at the same time close upon it sufficiently tight to admit of the plant being lifted up with one hand in position to be conveniently grasped with the other hand.

My invention in its more specific nature relates to the particular construction of the two jaws forming the lower extremities of the tongs, all of which will hereinafter be first described in detail and then pointed out in the appended claims, reference being had to the accompanying drawings, in which—

Figure 1 is a view illustrating my invention as in use. Fig. 2 is a similar view, the implement being shown as lifting the plant. Fig. 3 is a side elevation of the implement closed into a cutting and clamping position. Fig. 4 is a detail view illustrating the pivotal joint of my improved implement. Fig. 5 is a detail perspective view of one of the detachable jaws and a part of the socket end of the tongue that it fits; and Figs. 6 and 7 are detail views of modified forms of the jaws, each of which will be hereinafter particularly referred to.

In its practical construction my improved implement comprises a pair of bars or tongs $a\ b$, which cross each other and have a pivotal joint at their crossing-point. This joint instead of including the usual pivotal bolt is constructed with a view of connecting the two bars to open and close like the ordinary pivoted tongs or shanks and also to provide for a slight endwise movement of one bar or tong upon the other, the reason for which will presently appear, and for such purpose the bar $a$ is made with a seat or recess portion $a'$ to receive the reduced or web part $b'$ of the bar $b$, said web part being formed by cutting down the bar at opposite sides, said bar $b$ being held in place by a holding-piece $c$, screwed, riveted, or otherwise made fast to the bar $a$, as shown. The web portion $b'$ is made longer than the width of the bar $a$ to allow for a free opening and closing of the two bars and also for an endwise movement of the bar $b$ upon the bar $a$, before referred to. The lower ends of the bars $a\ b$ terminate in internally-threaded sockets $a^2\ b^2$ to receive the combined cutter and clamping members $d$, said members having threaded tenons $d'$ to engage the sockets $a^2\ b^2$, in which they are securely held by the screw or pin fasteners $e$, as shown.

The object in providing the bars or tongs each with a combined cutting and clamping member removably connected therewith is to admit of the said members being easily detached when it is desired to sharpen them or straighten them when worn and also for replacing the said cutters with new ones when they become useless. The two detachable members 10 20, the peculiar construction of which forms an essential feature of my invention, each have a clamping-jaw end $10^a\ 20^a$, and the member 10 is made somewhat longer than the member 20, the reason whereof will presently appear.

By referring now to Figs. 2 and 3 it will be noticed that the jaws $10^a\ 20^a$ are shovel-shaped, and in the simplest construction illustrated in the said figures the body of each jaw is made solid, while the lower end thereof tapers to a point or cutting edge, the said lower edges of the two jaws, however, being bent inwardly toward each other to form claws. The claw ends of the two members do not oppose each other—that is, close directly upon each other—but one claw end extends below the other, so that the claw end of the short member when the two jaws are closed will engage the solid curved part X of the extended jaw $10^a$. The object in thus arranging the two jaws is twofold. First, it provides for thrusting the long jaw down into the earth close to the root of the plant, like an ordinary grubbing-blade, and, secondly, by reason of the difference in length of the two jaws, when the long jaw has been inserted the closing in of the two jaws serves to effect, first, a cutting action, which is accomplished by the jaw 20ª shearing off the plant as it, the said jaw 20ª, closes onto the solid part of the jaw 10ª, and, again, it provides for clamping the stalk or butt-end of the plant between the two jaws sufficiently to allow the operator to lift the cut-off plant as he elevates the appliance with one hand into a position convenient for grasping the plant with the other hand, as shown in Fig. 2.

By connecting the two bars $a\,b$, so that one of them (the bar $b$) can be moved slightly in the direction of its length, it is manifest that the shearing or cutting action of the jaw 20ª can be materially augmented by simply drawing the bar $b$ upward as the jaw 20ª is closed upon the jaw 10ª, such action producing a more effective cutting off of the plant than would be possible by the mere closure of one claw against the other.

I am aware that grubbing implements, plant-pullers, and other devices of like character have heretofore been provided having two pivoted members, each of which carries a jaw or claw on the other end, and the two members being arranged to close against each other to grip the plant. My invention differentiates from implements of the above-stated kind, so far as I know, in that the two pivoted bars are so joined that one will have a slight longitudinal movement on the other. The combined cutting and clamping jaws are detachably connected to the handles, one of the said jaws being longer than the other and the claw end of one jaw being made to close inwardly against the flat surface of the other jaw to act with a shearing action and also as a clamping member. The shorter jaw, by reason of the dished or concaved character of both jaws, can be closed in sufficiently to grip the plant, the said closing movement being variable, in accordance with the thickness of the plant, and obtainable by the peculiar correlation of the two jaws and the novel construction of each jaw.

If desired, each jaw may be made with an opening Y, as indicated in Fig. 6, to permit the dirt to drop through that may adhere to the plant-stalk and the face of the jaw.

If desired, the lower or cutting edges of each claw may be scalloped, as indicated in Fig. 7. The same is of an exceedingly simple construction, and by reason of making the members 10 20 detachable the same pair of tongs or bars $a\,b$ may be continuously used with new members 10 20. The detachability of the members 10 20 is also advantageous in this respect. The two members 10 20 may be made of like lengths and be duplicates, as the difference in their length can be provided in connecting the said members to their respective tongs or bars $a\,b$, it being understood that by screwing one member home in its receiving-socket and leaving the other one extended the adjustability of the two members 10 20, so far as it relates to projecting the member 10 below the member 20, can be regulated at will.

Having thus described my invention, what I claim, and desire to secure by Letters Patent, is—

1. In an implement for the purposes described, the combination with the pivoted tong members, the upper ends of which terminate in handle portions and whose lower ends terminate in sockets, of a pair of jaw members one for each tong or bar, said jaw members each having means whereby they are detachably secured to the socketed ends of the tongs, the lower ends of the said jaws being flat and terminating in claws, the claw portion of one jaw being extended below the claw portion of the other jaw, whereby the claw portion of the said other jaw will close upon the flat part of the opposing jaw, substantially as shown and described.

2. An implement for the purposes described having detachable clamping-jaws, each having its lower end flattened and formed with an inwardly-extending claw member and means for connecting the two claw members to the tongs so that one of the claw members will project in a plane below the other whereby the cutting edge of the said other jaw will engage the flat surface of the opposing jaw, substantially as shown and described.

3. As a new article of manufacture, an implement for cutting and lifting asparagus and like plants, comprising a pair of pivoted tongs, the pivoted joint of the said tongs being such that one tong will have a limited movement in the longitudinal direction upon the other, the lower edge of each tong terminating in an internally-threaded socket, a detachable jaw for each tong, said jaws having screw-threaded tenons to engage the threaded sockets of their respective tong members, each jaw terminating in a shovel-like portion, the lower end of which curves inwardly and terminates in a cutting edge, said shovel-like portion having an opening for the escape of dirt, and one of the jaws being shorter than the other, whereby its claw or cutting edge will engage the opposing jaw at a point above its penetrating edge, all being arranged substantially as shown and described.

THOMAS ESTLACK.

Witnesses:
JAMES S. SHUTE,
WM. M. CARTER.